Figure 1:
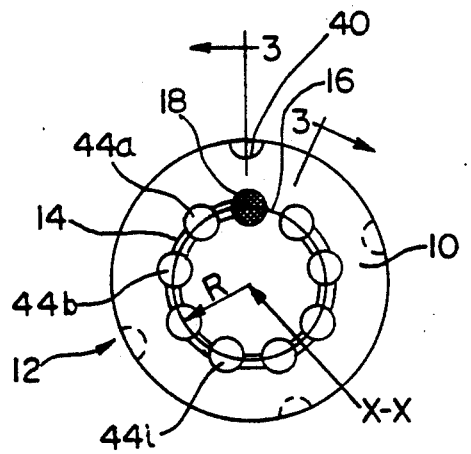

United States Patent [19]

Bourlon

[11] Patent Number: 5,287,891
[45] Date of Patent: Feb. 22, 1994

[54] FLOW LIMITER

[75] Inventor: Philippe Bourlon, Aubervilliers, France

[73] Assignee: Bendix Europe Services Techniques, Drancy, France

[21] Appl. No.: 850,723

[22] Filed: Mar. 13, 1992

[30] Foreign Application Priority Data

Mar. 29, 1991 [FR] France .................. 91 03856

[51] Int. Cl.[5] .............................................. F15D 1/14
[52] U.S. Cl. ........................................ 138/43; 138/40; 138/46
[58] Field of Search ................. 138/40, 41, 42, 43, 138/46; 251/205, 208

[56] References Cited

U.S. PATENT DOCUMENTS

| | | | |
|---|---|---|---|
| 1,964,300 | 6/1934 | Perry et al. | 158/115 |
| 2,012,004 | 8/1935 | Hall et al. | 138/43 |
| 2,236,084 | 3/1941 | Brown | 138/43 |
| 2,290,783 | 7/1942 | Turpin | 138/46 |
| 2,481,705 | 9/1949 | Whitney | 138/42 |
| 3,375,855 | 4/1968 | Deeks | 138/42 |
| 3,532,126 | 10/1970 | Boothe | 138/43 |
| 3,532,127 | 10/1970 | Vogelsang et al. | 138/43 |
| 4,011,893 | 3/1977 | Bentley | 138/43 |
| 4,738,665 | 4/1988 | Shepard | 138/43 |
| 4,896,867 | 1/1990 | Schyboll et al. | 138/43 |
| 4,909,490 | 3/1990 | deFontenay | 138/43 |

FOREIGN PATENT DOCUMENTS

| | | |
|---|---|---|
| 653469 | 11/1937 | Fed. Rep. of Germany . |
| 2444350 | 6/1975 | Fed. Rep. of Germany ........ 138/43 |
| 479013 | 11/1969 | Switzerland . |
| 979459 | 1/1965 | United Kingdom . |

*Primary Examiner*—Harvey C. Hornsby
*Assistant Examiner*—James F. Hook
*Attorney, Agent, or Firm*—Larry J. Palguta; Ken C. Decker

[57] ABSTRACT

The invention relates to a flow limiter for hydraulic fluid, comprising at least one passage (14) of reduced cross-section for the hydraulic fluid, the passage (14) being formed between two contiguous pieces (12, 22) each having at lest one planar face (10, 20), at least one of the two pieces (12, 22) comprising a recessed impression (14) on at least one of its faces (10, 20), the passage (14) of reduced cross section being defined within the space situated between the recessed impression (14) formed on a planar face (10) on one of the pieces and the planar face (20) of the other piece (22), the length of the passage (14) of reduced cross section being adjustable by varying the relative position of the two pieces (12, 22). According to the invention, a pierced hole (18) is made in one piece (12) at one end of the passage (14) of reduced cross section and in that a pierced hole (24) is made in the other piece (22) at the other end of the passage (14) of reduced cross section.

5 Claims, 1 Drawing Sheet ical fluids.

FLOW LIMITER

The present invention relates to flow limiters, in particular for hydraulic fluids.

It is common, for example when designing a machine tool, to provide, for the sake of economy, an installation capable of functioning at cycles following the various types of machining to be carried out. Flow limiters or regulators are then used which make it possible to adapt the working speed to the needs of production. These flow limiters are then, in a known manner, cut in or cut out by appropriately pilot-controlled distributors or electrovalves. Flow limiters are also used when it is desired to slow down the operation of a pressure receiver such as a hydraulic jack or a hydraulic motor.

It is also known that, in order to reduce the flow of a fluid, either the cross-section of the passage taken by the fluid must be restricted, or the length of the passage must be elongated in order to increase the head loss. Thus, for each application, a flow limiter can be specified which comprises, for example, a passage whose cross-section and length are such that for a given pressure of the fluid upstream of the limiter, the pressure of the fluid downstream will have a predetermined value, and hence that the flow of fluid through the limiter will have a predetermined value. However, it will be absolutely impossible to use a flow limiter constructed in this way for a different application, and it will then be necessary to design another limiter.

The document GB-A-979 459 makes known a flow regulator which enables the quantity of fluid passing through it to be varied continuously with a constant upstream pressure, but it has a complicated structure and is awkward to handle.

The object of the present invention is therefore to provide a flow limiter which enables a fluid flow to be supplied which can be adjusted to a predetermined value by means which are simple, inexpensive and easy to employ.

To this end, the present invention proposes a flow limiter for hydraulic fluid, comprising at least one passage of reduced cross-section for the hydraulic fluid, the passage being formed between two contiguous pieces each having at least one planar face, at least one of the two pieces comprising a recessed impression on at least one of its faces, the passage of reduced cross section being defined within the space situated between the recessed impression formed on a planar face on one of the pieces and the planar face of the other piece, the length of the passage of reduced cross section being adjustable by varying the relative position of the two pieces.

According to the invention a pierced hole is made in one piece at one end of the passage of reduced cross section and in that a pierced hole is made in the other piece at the other end of the passage of reduced cross section.

Figure 2:
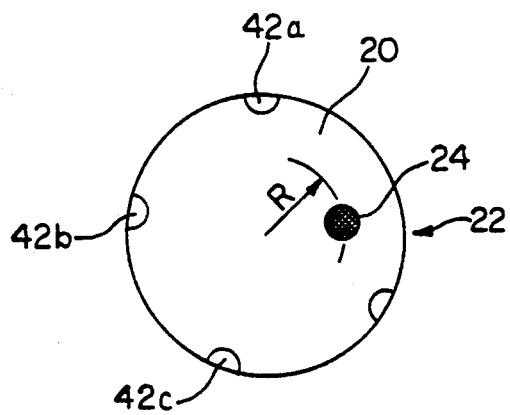
Figure 3:
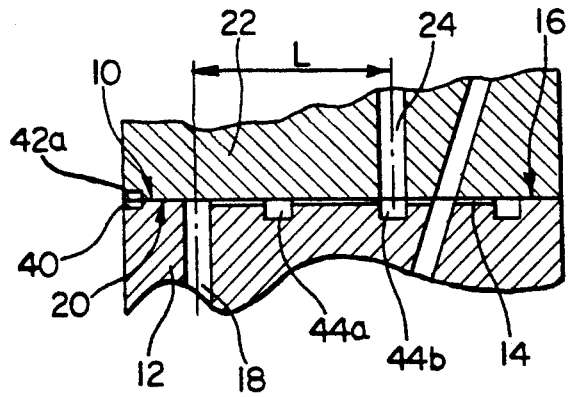
Figure 4:
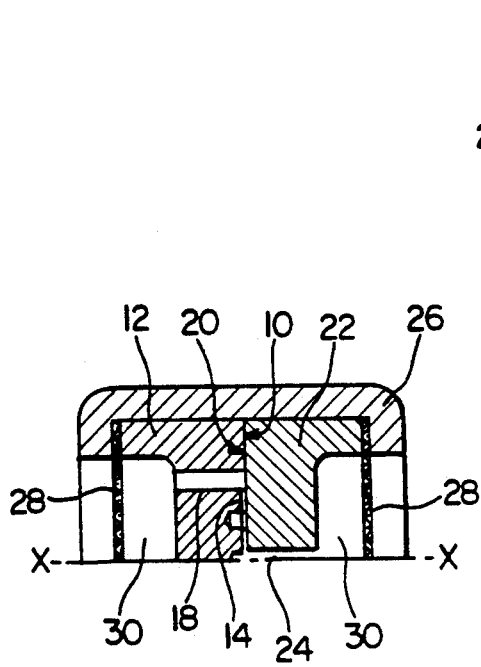
Figure 5:
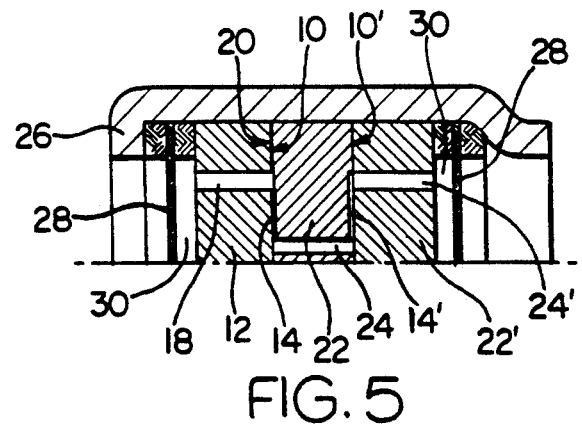

The invention will now be described by way of example with reference to the accompanying drawings in which:

FIG. 1 is an end view of a piece constituting a flow limiter in accordance with the present invention, FIG. 2 is an end view of another piece of a flow limiter in accordance with the present invention, FIG. 3 is a developed sectional view along the line 3—3 in FIG. 1, FIG. 4 is a sectional view of a flow limiter constructed in accordance with the present invention, and FIG. 5 is a sectional view of an alternative of a flow limiter constructed in accordance with the present invention.

In FIG. 1, a planar face 10 can be seen of a cylindrical piece 12 on which a recessed impression has been formed. In the example shown, this impression forms a circular channel 14, the center of which is on the axis X—X of the cylindrical piece 10. To be more precise, the channel 14 is formed on a portion of a circle of radius R so as to create a planar zone 16 in continuity with the remainder of the face 10. At one of the ends of the channel 14, a pierced hole 18 is made in the piece 12 parallel to the axis X—X and traversing the piece 12.

In FIG. 2, a planar face 20 can be seen of another cylindrical piece same diameter as that of the cylindrical piece 12. A pierced hole 24 is made in the piece 22, parallel to its axis, at a distance R from the latter, and traversing the piece 22.

The flow limiter or restrictor is constructed in accordance with the invention by applying the faces 10 and 20 of the pieces 12 and 22 respectively against each other. If the pierced holes 18 and 24 are situated opposite one another, the hydraulic fluid arriving, for example, through the pierced hole 18 will encounter no obstacle in its passage into the pierced hole 24. If, on the other hand, the pierced hole 24 is not aligned with the pierced hole 18 and is not opposite the zone 16, then the hydraulic fluid arriving through the pierced hole 18 will have to follow the channel 14 forming a passage of reduced cross-section over a certain length L in order to reach the pierced hole 24 and thus to leave the flow limiter, as illustrated in FIG. 3.

It will therefore be understood that, by rotating the pieces 12 and 22 relative to each another, the length L over which the hydraulic fluid must travel is varied. Therefore, in this way the head loss experienced by the pressurized fluid is varied.

Once the desired value has been reached, the pieces 12 and 22 can be immobilized with respect to each other, for example by ultrasonic welding. It is also possible, alternatively or additionally, to encapsulate the pieces 12 and 22, once their relative position has been determined, in a cylindrical sleeve 26, the edges of which are folded back, for example by crimping, in order to hold the pieces 12 and 22 in contact and in their relative position. It will then be possible, advantageously, to arrange filters 28, to prevent any intrusion of impurities into the device, on the faces of the pieces 12 and 22 which are not in contact and which form the ends of the limiter. The faces of the pieces 12 and 22 which are not in contact are not necessarily planar and can, as has been shown in FIG. 4, comprise a d forming, together with the filters 28, chambers 30 for the inlet and outlet of the fluid.

According to the alternative embodiment illustrated in FIG. 5, a hollow cavity or channel 14', similar to the channel 14 and beginning at the location where the pierced hole 2 4 opens out onto the face 10', has been formed on the face 10' of the piece 22 which is not in contact with the face 10 of the piece 12.

This channel 14' provides a new restriction, which is also adjustable, on the passage of the fluid between the pierced hole 24 and a pierced hole 24' of a piece 22' identical to the piece 22 described above. It can therefore be seen that, advantageously by virtue of the invention, it is possible to construct a flow limiter which provides a substantial restriction on the passage of a fluid, equivalent to that of a plurality of flow limiters placed in series. In this embodiment, it is clear that the channels 14 and 14' can each be formed on one of the faces 20, 10' of the central piece, the end pieces then being identical.

It may also happen that, in certain installations or for certain applications, the restrictions to be provided on a fluid flow are known in advance and have a certain number of separate values. It is then desirable to provide pieces 12 and 22 which can be assembled in the above-described manner in order to have directly the desired limitation of the flow, in other words the length of passage of reduced cross-section in the channel 14.

This object is also achieved in a simple manner by virtue of the present invention. Indeed, to this end it is possible to provide an indexing of the pieces 12 and 22 relative to each other. To be more precise, and as has been shown in FIGS. 1 and 2, it is possible to provide, for example, a marker 40 on the piece 12, and a plurality of markers 42a, 42b, 42c, . . . on the other piece 22. Consequently, when the faces 10 and 20 of the pieces 12 and 22 are applied against each other, all that is required in order to have immediately the required value of the required restriction is to bring the marker 40 into alignment with one of the markers 42i.

The indexing markers 40 and 42i can take numerous forms. They can, for example, consist of a marking on the outer cylindrical part of the pieces 12 and 22. They can also take the form of a boss 40 which protrudes from the plane of the face 10 of the piece 12 and interacts with one of the marker 42i which are then in the form of recessed parts of a shape complementing that of the boss 40. Alternatively, the marker 40 can take the form of a groove made on the cylindrical surface of the piece 12 and parallel to the axis X—X, the markers 42i likewise being made in the form of grooves made on the cylindrical surface of the piece 22 and parallel to its axis of revolution. Consequently, it is sufficient to align the groove 40 and one of the grooves 42i. The advantage of this latter alternative is that the single groove formed by joining the groove 40 together with one of the grooves 42i can interact with a rib formed on the inside of the sleeve 26 parallel to the axis X—X.

In the case where separate flow-restriction values are required, it is also advantageously possible to provide for recesses 44a, 44b, . . . , 44i, which are obtained by milling, to be formed on the channel 14 and at the various angular positions provided in order to face the pierced hole 24 during the assembly of the limiter, in such a way that they have on the face 10 a diameter equal to that of the pierced hole 24, as has been shown in FIGS. 1 and 3. The advantage of forming these recesses 44i lies in the fact that the portion of channel 14 between two recesses can then have a perfectly determined length, and that a slight angular offset between the pieces 12 and 22 out of the desired position will have no effect on the effective length of the channel 14 over which the fluid travels.

A particularly simple flow limiter is thus formed according to the invention. This limiter is obtained by assembling two pieces in a configuration which is determined by the value of the limitation to be obtained. These two pieces are identical and in order to form flow limiters of very different properties they are simply assembled in different relative positions. They can therefore be mass produced, and hence have very low manufacturing costs.

Although only some embodiments have been described, the invention can have numerous modifications which will appear to a person skilled in the art to be of benefit and which fall within its scope. Thus, the pieces 12 and 22 can have a symmetry other than a cylindrical symmetry, as has been shown. They can, for example, be parallelepipeds with 3, 4 or any number of sides. Similarly, a flow limiter can be constructed in which the variation in the length of the passage of reduced cross-section along the channel 14 is no longer obtained by a relative rotation of the pieces 12 and 22 but by a relative translational movement of these pieces, in the manner of a slide-valve distributor.

I claim:

1. A flow limiter for only hydraulic fluid, comprising at least one passage of reduced cross-section for the hydraulic fluid and formed only between two nonresilient contiguous pieces each having at least one planar face, one of the pieces comprising a recessed impression on the respective planar face, the passage of reduced cross-section defined between the recessed impression formed on the respective planar face and the planar face of the other piece, the length of the passage of reduced cross-section being adjusted by varying the relative positions of the two contiguous pieces, a hole located in one piece at one end of the passage of reduced cross-section and a hole located in the other piece at the other end of the passage of reduced cross-section, and recesses located along the recessed impression formed on the respective planar face in order to obtain between two adjacent recesses a passage of reduced cross-section of a precisely determined length such that a slight variation in the relative positions of the two contiguous pieces has no effect on said precisely determined length, and varying the positions of the pieces relative to one another effecting serially an alignment of the hole located in the other piece with the recesses.

2. The flow limiter according to claim 1, wherein the recesses have at the respective planar face a diameter equal to that of the hole in the other piece.

3. The flow limiter according to claim 2, wherein the two contiguous pieces are indeed relative to each other.

4. The flow limiter according to claim 1, wherein the adjustment of the length of the passage of reduced cross-section is obtained by rotation of the two contiguous pieces relative to one another.

5. The flow limiter according to claim 1, wherein the adjustment of the length of the passage of reduced cross-section is obtained by a translation of the two pieces relative to one another.

* * * * *